United States Patent Office 3,211,471
Patented Oct. 12, 1965

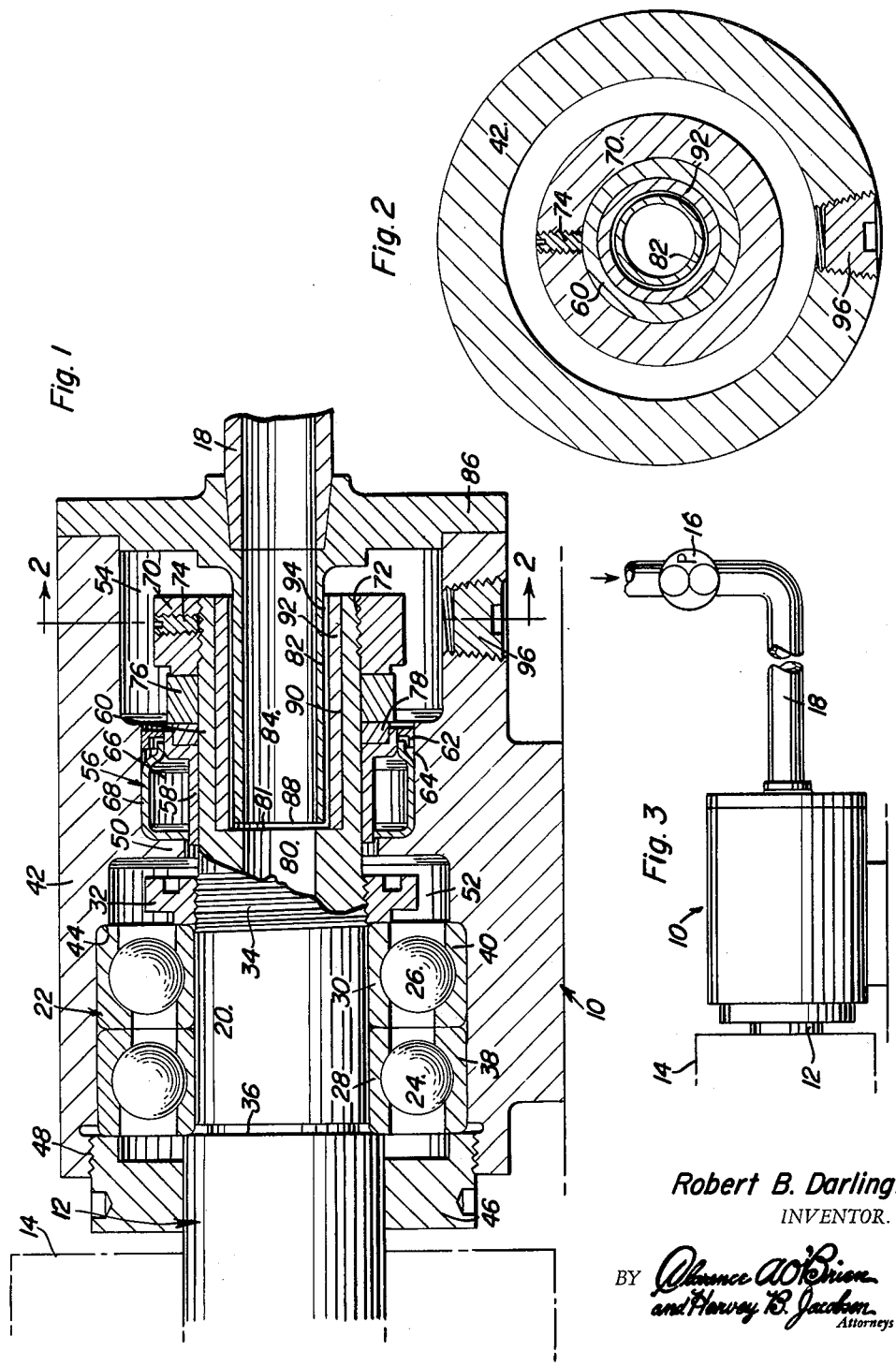
Robert B. Darlington
INVENTOR.

3,211,471
FLUID TRANSFER GLAND
Robert B. Darlington, 33 Shingle Mill Road,
West Simsbury, Conn.
Filed Apr. 14, 1961, Ser. No. 103,091
1 Claim. (Cl. 285—41)

This invention relates to a fluid transfer gland assembly by means of which fluid under pressure may be conducted from a stationary source into a fluid passage within a rotating shaft.

The present invention is concerned with the problem of transferring fluid under pressure such as oil through a shaft rotating at a substantially high speed with a reduced or controllable amount of fluid leakage despite the relatively high pressure with which the fluid is being introduced through the shaft. While rotary shaft fluid transfer gland assemblies have heretofore been used for the aforementioned purpose, none of them have been satisfactory at the higher shaft speeds and fluid pressures with which the present invention is concerned.

It is therefore a primary object of the present invention to provide a gland assembly particularly useful for the transfer of fluid under pressure between a stationary source and a high speed rotating shaft capable of handling fluids at pressures as high as 2500 p.s.i. through shafts rotating at speeds as high as 20,000 r.p.m.

Another object of this invention is to provide a high speed rotary shaft fluid transfer gland capable of handling high fluid pressures by means of an assembly which is readily installed on the end of rotating shafts.

In accordance with the foregoing objects, fluid under pressure may be introduced into a fluid passage formed within a rotating shaft by journalling the shaft within the gland assembly which includes axial thrust bearings and a pressure seal which separates the thrust bearings from a leakage chamber into which leakage fluid is received. The leakage fluid is however received at a reduced volumetric rate and pressure for safe exposure to the seal assembly and for cooling thereof. The gland arrangement is such as to maintain the fluid leakage at controllable amounts and negligible pressure and also accomplish the foregoing objects without introducing any significant fluid losses in conducting the fluid between the stationary source and the fluid passage within the rotating shaft.

It is therefore a further object of this invention to provide a high speed high pressure fluid transfer gland capable of performing its functions with a minimum of fluid flow energy losses.

A still further object of this invention is to provide a fluid transfer gland which includes a fixed axial insert conduit disposed within one end of a rotating shaft for conducting fluid under pressure from a stationary source into a fluid passage within the rotating shaft, the shaft mounting therewithin a bushing which forms about the insert an annular restricted passage through which leakage fluid is conducted in a reverse direction to that of the fluid flow to thereby reduce the fluid leakage which may expand into a leakage chamber and cool the pressure seal mounted on the shaft.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a longitudinal sectional view through a fluid transfer assembly in accordance with the present invention.

FIGURE 2 is a sectional view taken through a plane indicated by section line 2—2 in FIGURE 1.

FIGURE 3 is a diagrammatic illustration of the fluid gland installation.

Referring now to the drawing in detail, it will be observed that the fluid gland assembly is generally referred to by reference numeral 10 and is applied to a high speed rotating shaft generally referred to by reference numeral 12 which may project out of one axial end of any machine, device or apparatus 14 into which it is desired to introduce fluid under pressure such as oil for various different purposes such as lubrication, or hydraulic actuation. Accordingly, as diagrammatically illustrated in FIGURE 3 a stationary source of fluid under pressure from pump 16 is conducted by a conduit 18 for connection to the transfer gland assembly 10 by means of which the fluid under pressure is conducted through the shaft 12 into the apparatus 14.

The shaft 12 includes an end portion 20 which is stepped down for the purpose of mounting thereon a spaced axial thrust bearing assembly 22. The bearing assembly 22 accordingly includes a pair of ball bearings 24 and 26 the inner races 28 and 30 of which are maintained in axial assembly on the portion 20 of the shaft 12 between the axial thrust collar 32 threadedly mounted on the shaft by means of the threaded portion 34 and the shoulder 36. The outer races 38 and 40 of the ball bearings 24 and 26, are maintained in axial assembly within the stationary housing 42 between the internal shoulder 44 thereof and the axial thrust collar 46 which is threadedly engaged within the internal threaded portion 48 at the inner axial end of the housing 42.

A partition wall 50 is formed within the housing 42 separating the bearing chamber 52 from a leakage chamber or reservoir 54 which is formed at the outer axial end of the housing 42. The bearing chamber 52 is maintained in fluid tight relation to the leakage chamber 54 by means of a pressure seal assembly generally referred to by reference numeral 56. The seal assembly accordingly includes an inner member 58 mounted on an axially outer portion 60 of the shaft 12. Connected to the inner member 58 is an annular wiper element 62 which is in contact with an annular surface 64 within the housing 42. Packing 66 is disposed between the inner member 58 and the outer annular member 68. The seal assembly 56 is maintained under adjusted axial pressure by means of an adjusting collar 70 which is positioned on threaded portion 72 at the outer axial end of the shaft portion 60 and held in axially fixed position by means of the setscrew element 74. The adjusting collar 70 bears against a thrust collar 76 which in turn applies pressure to the seal assembly 56 through the relatively resilient washer element 78.

It will be observed that the shaft 12 has formed therewithin a fluid passage or bore 80 into which fluid under pressure is introduced from the pressure source 16. The fluid passage or bore 80 is accordingly in axial alignment with an annular steel insert 82 constituting a stationary conduit with an axial passage 84 having a flow area substantially equal to that of the fluid passage 80 and axially aligned therewith so as to conduct flow from the fluid conduit 18 to the fluid passage 80 with minimum fluid losses. The conduit 82 is accordingly connected to or formed integral with a closure member or bell 86 which closes the outer axial end of the annular leakage chamber or fluid reservoir 54 and also receives the end of the conduit 18. It will be observed, that leakage of fluid flowing between the stationary conduit 82 and the passage 80 within the rotating shaft 12, will occur between the inner axial end 88 of the conduit 82 and the outer axial end 81 of the fluid passage 80.

The portion 60 of the shaft 12 beyond the outer axial end of the fluid passage 80 is therefore formed with an enlarged diameter bore 90 for the purpose of receiving therewithin a bronze or other bearing material leakage bushing 92 which forms a restricted annular passage or orifice 94 about the outer surface of the fixed conduit member 82. Accordingly, any leakage that may occur between the passages 84 and 80 will necessarily flow in a direction opposite to that of the flow of fluid between the passages 84 and 80 and through the restricted passage 94 which is in fluid communication with the leakage chamber 54. The leakage chamber 54 will therefore receive reduced amounts of leakage which may be useful for cooling the pressure seal assembly and yet not subject the seal assembly to the high pressure of the fluid within the passages 84 and 80. The housing 42 is therefore also provided with a drain plug 96 by means of which the leakage chamber 54 may be drained of accumulated fluid.

By virtue of the foregoing arrangement, the assembly of the present invention is capable of handling unexpectedly high pressures for transfer through shafts rotating at relatively high speeds which ordinarily render transfer gland assemblies heretofore used unsatisfactory. Also, the arrangement achieves its purpose by reducing the leakage and the pressure of the leakage fluid to which the pressure seal is exposed without introducing fluid losses to the flow of fluid. The unexpectedly improved results achieved by the structural arrangement hereinbefore described, may be explained by the fact that any leakage that does occur between the passages 84 and 80 is directed in a reverse direction through the annular orifice passage 94 formed between the inner surface of the bushing 92 and the outer surface of the steel insert conduit 82, which passage 94 is in communication with the high pressure leakage inlet formed between the respective ends 88 and 81 of the axially aligned passages 84 and 80 and the reduced pressure chamber 54 into which the leakage fluid may expand. Inasmuch as the flow area of the passage 94 is of an extremely reduced value flow through said passage will be essentially laminar in characteristic. Accordingly, despite the high static pressure differential between the leakage chamber 54 and the passages 84 and 80, leakage flow will be of an extremely low or negligible amount in view of the fact that laminar flow of incompressible fluids in pipes has been shown to be proportional to the fourth power of the flow area and inversely proportional to the distance of such flow, in accordance with the Hagen-Poiseuille law for laminar flow in circular pipes. Accordingly, it will be appreciated that the reduced flow area of the passage 94 and the substantial distance thereof through which the leakage flow must proceed, accounts for the extremely low rate of leakage flow that will occur despite the high static pressure differential which exists between the leakage chamber 54 and the passages within the shaft. Furthermore, the aforementioned advantages of the gland assembly of the present invention are achieved by a structural arrangement capable of being easily installed and manufactured with great economy.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A fluid transfer assembly for conducting fluid under pressure from a stationary source to a rotating shaft comprising an enlarged housing, an elongated shaft projecting into said housing through one side thereof, bearing means within said housing adjacent said one side, said bearing means rotatably supporting said shaft, the inner end portion of said shaft being cantilevered inward of the housing from the bearing means, said shaft having an axial bore and a counterbored inner end, a bell closing and sealing a side of said housing opposite said first side and forming an end closure for a fluid receiving reservoir about said cantilevered end of said shaft forward of the inner end of the shaft, a conduit integrally engaged with said bell for conducting fluid through said bell from a point external of said housing, said conduit projecting coaxially into the counterbored inner end of the shaft, said conduit having an external diameter less than the internal diameter of the counterbored inner end of the shaft so as to define an annular passage therebetween to communicate with said reservoir, an annular bushing received in said counterbored inner end about said conduit, said bushing reducing the annular passage to a size wherein the flow therethrough will be substantially laminar in nature, an annular abutment means rigid with said housing and projecting generally radially toward the cantilevered portion of the shaft forward of the bearing means, annular seal means surrounding the cantilevered portion of the shaft and engaged between the shaft and housing and against the forward face of the abutment means, annular washer means surrounding the cantilevered portion of the shaft and engaged against the forward face of said seal means, annular collar means surrounding the cantilevered portion of the shaft and engaged against the forward face of the washer means, said collar means being longitudinally adjustable on said cantilevered shaft portion for compressing the seal means into sealing engagement with the abutment means so as to seal the reservoir from the rearward portion of the housing and the bearing means therein, means for locking the collar means in a longitudinally adjusted position, and a removable drainage plug selectively closing a drainage hole communicated with the reservoir surrounding the cantilevered shaft portion.

References Cited by the Examiner
UNITED STATES PATENTS

| | | | |
|---|---|---|---|
| 1,574,211 | 2/26 | Taylor | 285—13 |
| 2,185,822 | 1/40 | Young | 285—94 |
| 2,733,080 | 1/56 | Gill | 285—14 |
| 2,777,702 | 1/57 | Rodal | 277—3 X |
| 2,898,132 | 8/59 | Guerin | 285—95 |
| 3,129,960 | 4/64 | Schrodt | 285—14 |

CARL W. TOMLIN, *Primary Examiner.*

SAMUEL B. ROTHBERG, *Examiner.*